Aug. 23, 1960

W. M. BRUBAKER 2,950,387

GAS ANALYSIS

Filed Aug. 16, 1957

INVENTOR.
WILSON M. BRUBAKER

BY Christie, Parker & Hale

ATTORNEYS

Aug. 23, 1960 W. M. BRUBAKER 2,950,387
GAS ANALYSIS
Filed Aug. 16, 1957 3 Sheets-Sheet 2

INVENTOR.
WILSON M. BRUBAKER
BY
Christie, Parker & Hale
ATTORNEYS

Aug. 23, 1960 W. M. BRUBAKER 2,950,387
GAS ANALYSIS
Filed Aug. 16, 1957 3 Sheets-Sheet 3
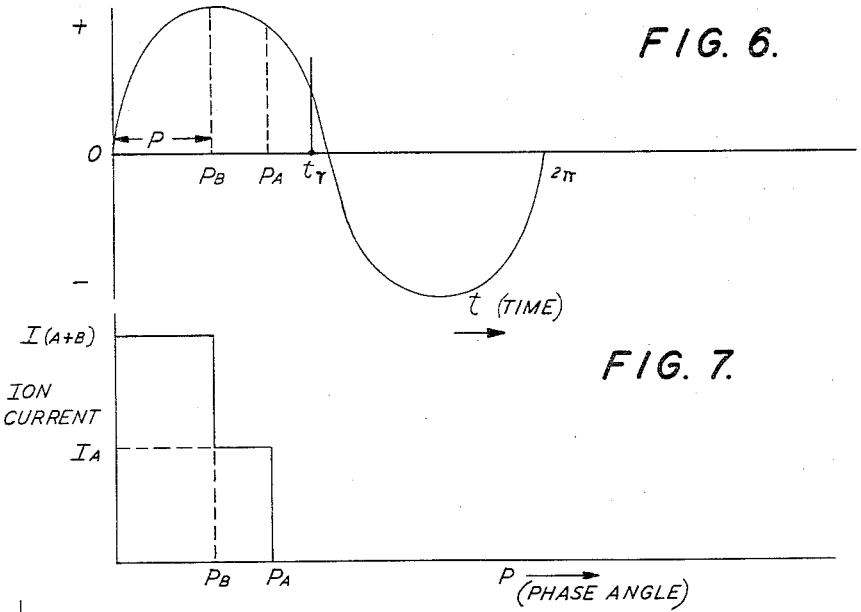
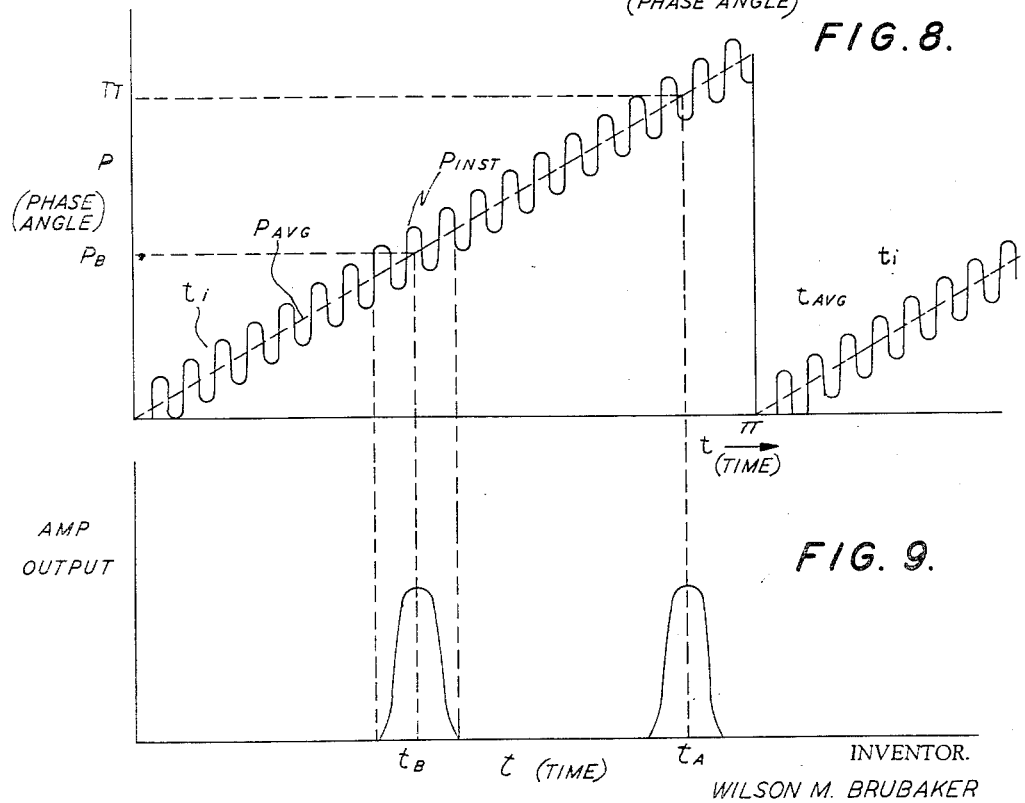
INVENTOR.
WILSON M. BRUBAKER
BY
Christie, Parker & Hale
ATTORNEYS United States Patent Office 2,950,387
Patented Aug. 23, 1960

2,950,387
GAS ANALYSIS

Wilson M. Brubaker, Arcadia, Calif., assignor to Bell & Howell Company, Chicago, Ill., a corporation of Illinois Filed Aug. 16, 1957, Ser. No. 678,598

5 Claims. (Cl. 250—41.9)

This invention relates to gas analysis, and is based on the principle of ionizing a gas mixture of components having different ionic mobilities.

Many compounds can be ionized by bombardment with electromagnetic radiation of suitable energy, such as gamma rays, X-rays, and ultraviolet light.

It is sometimes desirable to measure the relative abundance of components in a gas mixture in which at least two of the components have different ionic mobilities. For the purpose of describing this invention, the term "ionic mobility" is defined as the velocity of an ion in an electric field. This invention provides a method for determining the composition of a gas sample by measuring the ionic mobility of at least one of the components in the sample. The invention is particularly useful in analyzing gas samples made up of components having about the same ionization potential and the same ionization cross section, but different ionic mobilities.

Briefly, the invention contemplates the method for analyzing a gas sample having at least two constituents which have different ionic mobilities. The constituents are ionized, and the ions are subjected to an electric field between two electrodes. The duration of the field is limited to a time which permits more ions of higher mobility to be collected at one of the electrodes than ions of lower mobility. The collected ions are detected, or preferably measured as an indication of the relative abundance in the sample of the constituent having the higher ionic mobility. If only two constituents are present in the sample, determining the relative abundance of one permits the determination of the other by difference.

Preferably, the method includes the steps of periodically reversing the electric field and maintaining it in a reversed condition for a sufficient length of time to permit all ions to be collected at an electrode, i.e., "neutralized." The electric field is then restored to its original condition, and the gas sample is again subjected to bombardment by electromagnetic energy of sufficient energy to ionize at least some of the constituents. The more mobile ions are collected at one of the electrodes as long as the field is maintained in the proper direction. When the field is discontinued or reversed for the "neutralization" cycle, there is no bombardment of the sample by electromagnetic radiation.

In effect, the invention utilizes the measurement of ion velocity or mobility to achieve gas analysis, and this is accomplished by subjecting the ions of the different constituents to conditions in which the "transit time" of the ions is controlled to permit preferential collection and measurement of the faster ions. When analysis is desired of a gas sample containing several components with different ionic mobilities, the time of flight conditions are progressively varied so that ions of different mobility are selectively collected to make a complete analysis of the gas sample. The transit times for the ions can be varied by changing any one or more of the following parameters: (1) the strength of the electric field, (2) the duration of the electric field, (3) the distance between the region of ionization and the electrode to which the ions are attracted, and (4) the phase angle between the ionizing radiation and the electric field.

These and other aspects of the invention will be more fully understood from the following detailed description taken in conjunction with the accompanying drawings in which:

Fig. 6 is a plot of time versus voltage applied across the collector plates of Fig. 5;

Fig. 7 is a plot of ion current of the apparatus of Fig. 5 versus phase relationship between the ionizing radiation and the electric field;

Fig. 8 is a plot showing the presently preferred method for varying the phase relationship between the ionizing radiation and the electric field; and Fig. 9 is a plot showing signal response versus variations in phase relationship effected in the manner shown in Fig. 8.

Figure 1:
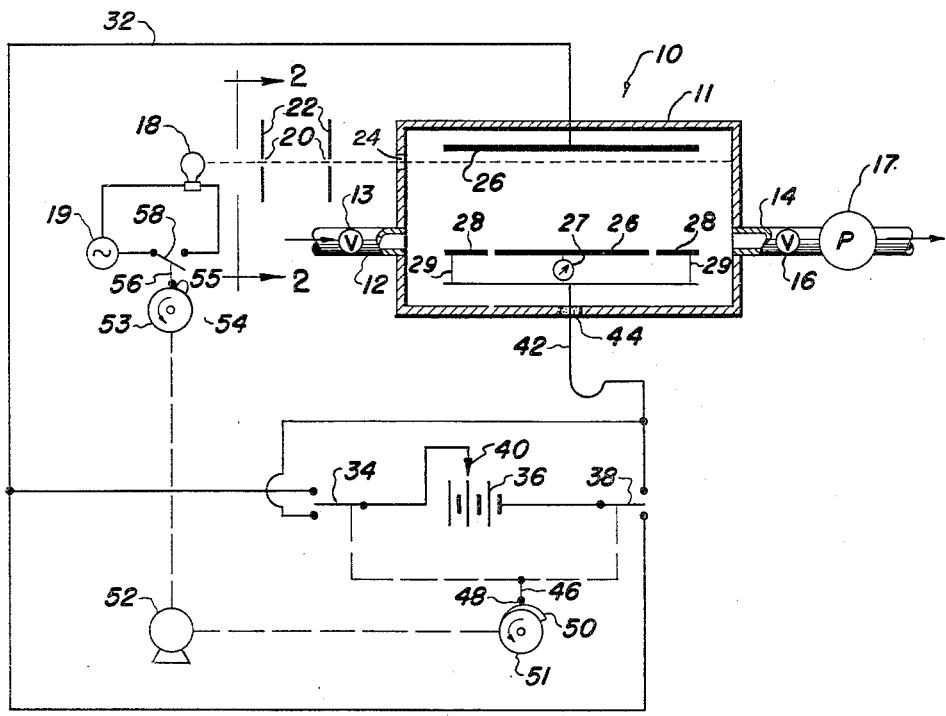
Fig. 1 is a schematic diagram of apparatus suitable for ionizing a gas sample and subjecting the ions to various times of flight conditions.
Figure 2:
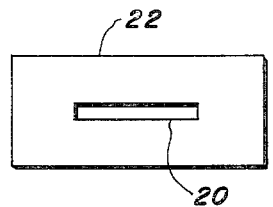
Fig. 2 is a view taken on line 2—2 of Fig. 1.

Referring to Fig. 1, an ionization chamber 10 includes an enclosed sample box 11 into one end of which a sample line 12 opens through a valve 13. An exhaust line 14 at the other end of the box is connected through a valve 16 to a pump 17 which is used to maintain the sample at the desired pressure in the ionization chamber. A source of electromagnetic radiation, say an ultraviolet lamp 18, is supplied power from a source 19 and is adapted to send pulses of ultraviolet light through collimating slits 20 in a pair of spaced collimating plates 22. A window 24 in the inlet end of the ionization chamber is collinear with the collimating slits and is of a suitable material transparent to the wave length of ultraviolet light required to ionize the gas sample. The collimating slits and window are all of the same size and shape, which is shown best in Fig. 2 as being elongated, rectangular openings so that the ultraviolet light passes through the ionization chamber in a relatively wide and thin plane.

An electric field perpendicular to the plane of ultraviolet light entering the ionization chamber is established between two horizontal and vertically spaced, rectangular plates 26 disposed in the sample chamber to be parallel to the plane of the ultraviolet light. The upper plate lies just above the incoming ultraviolet light, and the lower plate, which is the measuring or collecting electrode, is spaced a greater distance below the incoming light. One side of a direct current meter 27 is connected to the collector electrode, and a separate guard plate 28 spaced from each end of the collector electrode is connected by a lead 29 to the other side of the meter.

The upper plate is supplied voltage by a lead 32 which is sealed through the top of the ionization chamber and is adapted to be connected by a first two-way switch 34 to the positive terminal of a D.C. potential source 36, or by a second two-way switch 38 to the negative terminal of the D.C. source. The first switch is connected to the positive terminal of the D.C. source by a sliding contact 40 which permits the voltage supplied by the source to be varied.

The guard plates and the collector electrode are supplied voltage by a lead 42 which is slidably sealed through a packing gland 44 in the bottom of the ionization chamber. The lead 42 is adapted to be connected by the first switch to the positive end of the D.C. source, or by the second switch to the negative end of the D.C. source. The first and second switches are ganged together and actuated by a vertical push rod 46 having a roller 48 on its lower end which is adapted to roll on a ramp-step cam surface 50 of a first rotor 51 adapted to revolve in a counterclockwise direction as viewed in Fig. 1. The first rotor is powered by a variable speed motor 52 which also drives in a counterclockwise direction (as viewed in Fig. 1) a second rotor 53 having a ramp-step cam 54 engaging a roller 55 on the lower end of a vertical push rod 56 which is connected to a lamp switch 58 in series with the ultraviolet lamp.

The operation of the apparatus of Fig. 1 is as follows:

A sample is introduced into the chamber through the sample line and valve 13. The sample may either be passed through the ionization chamber continuously at the desired pressure, or it may be held in a static condition and its pressure adjusted to a desired value by the use of pump 17, valves 13 and 16 being closed when the desired pressure is reached.

With the sample in the ionization chamber at the desired pressure, the variable speed motor is turned at the desired speed to cause a reversing electrostatic field to be applied across the plates. As shown in Fig. 1, the first rotor is just beginning to lift the push rod 46 upwardly to cause the first switch to supply positive potential to the upper plate, and to cause the second switch to supply negative potential to the collector plate. The variable speed motor also rotates the second rotor, which is synchronized with the rotation of the first rotor to close the lamp switch when the upper plate is positive with respect to the collector plate, and thus supply momentarily U.V. radiation to the chamber which ionizes the components of the sample. The guard plates aid in maintaining a uniform electric field at each end of the collector electrode.

For the purposes of explaining the invention, it is assumed that positive ions are produced, and these ions are driven by the electric field toward the collector plate. The pressure of the gas sample, the distance between the plates, and the strength of the electric field are set so that for the time interval that the upper plate is positive and the lower plate is negative only the positive ions of the highest ionic mobility in the sample reach the collector plate, all of the other ions having such low mobility that the electric field is discontinued before they reach the collector plate.

As the two rotors revolve farther, the lamp switch is opened, and the positions of the first and second switches are reversed so that the upper plate is made negative and the lower plate is made positive. With the electric field thus reversed, the uncollected ions remaining in the ionization chamber are driven toward the upper plate. The cam on the first rotor is arranged so that the upper plate is held negative with respect to the lower plate for a period of time longer than under the reversed conditions, so that even the slowest moving of the ions are collected and neutralized at the upper plate, thus "cleaning up" the ionization chamber of ions.

Figure 3:
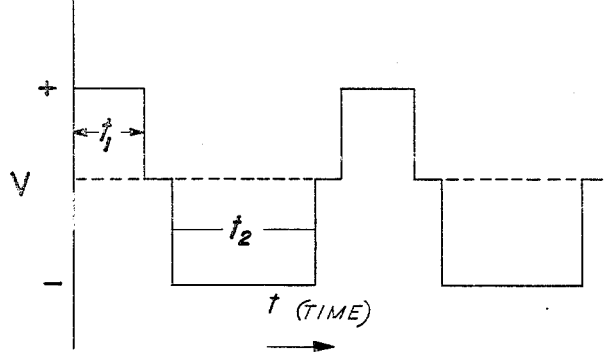
Fig. 3 is a plot showing one wave form of voltage applied to the electrodes of the apparatus of Fig. 1.

Fig. 3 shows graphically the voltage applied to the plates 26 as the first rotor is revolved. For example, the upper plate is made positive with respect to the lower plate for a time $t_1$. As the cam surface is revolved, the push rod 46 drops so that the positions of the first and second switches are reversed, making the upper plate negative with respect to the lower plate for a time $t_2$ which is substantially greater than time $t_1$ to insure that all ions are neutralized before the upper plate is again made positive with respect to the lower plate, and the gas sample is again radiated with ultraviolet light. Of course, if the nature of the gas components is such that negative ions are formed and are to be measured, then the terminals of the power source for the plates are reversed.

It will be appreciated that reversing the electric field and synchronizing ultraviolet radiation with the field can be accomplished in many ways other than by the specific circuitry shown. For example, conventional and well-known electronic components may be used to accomplish the same result, and may in some cases be desired for high speed operation.

Figure 4:
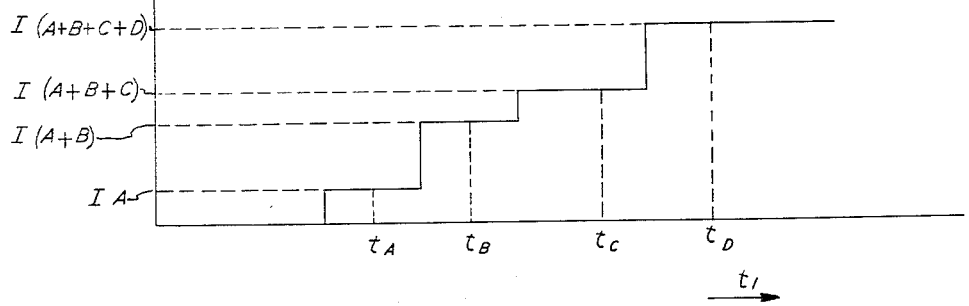
Fig. 4 is a plot of ion current versus time of flight conditions having a sample containing four components.

Fig. 4 shows a typical plot of ion current versus time $t_1$ which is obtained in analyzing a gas sample of components A, B, C, and D, all having different ionic mobilities. Assuming that the ionic mobilities decrease in the order of A, B, C, and D, an analysis of the sample is made as follows:

The variable speed motor is operated at the relatively high speed, so that the time $t_1$, that is, the time the upper plate is positive with respect to the lower plate, is relatively small, and not even the fastest ions are collected and measured when the sample is ionized by the flashing U.V. lamp. The speed of the motor is gradually reduced until time $t_1$ reaches a value $t_A$, so that the lower plate is negative with respect to the upper plate for a sufficient length of time to allow some of the ions of component A to be collected and measured, which gives an ion current $I_A$. The speed of the motor is further reduced until $t_1$ has a value of $t_B$ and the ions of component B are also collected to produce an ion current $I_{(A+B)}$. The motor speed is again reduced to give $t_1$ a value of $t_C$ which allows ions of component C to also be collected, and thereby produces an ion current of $I_{(A+B+C)}$. The speed of the motor is further reduced so that $t_1$ is equal to $t_D$ which permits the ions of component D to be collected and thereby produce an ion current of $I_{(A+B+C+D)}$.

As can be seen from Fig. 3, as the interval $t_1$ is increased, first the most mobile and then the less mobile ions reach the collector before the voltage reverses to clean up the ion chamber. As time $t_1$ is increased, time $t_2$ is also automatically increased so that there is ample time of reversed voltage to clean up all ions. The meter measures only the current caused by the neutralization of the ions on the collector plate. The spectrum obtained as $t_1$ is increased is thus a staircase, and the heights of the steps give a direct measure of the relative abundances of the respective ions in the mixture.

If the sample is to be analyzed for the presence of only one component, say component C, the time interval $t_1$ is alternately set at values $t_B$ and $t_C$, and the varying amplitude of the signal is a direct measure of the relative abundance of component C.

From the foregoing description, it will be understood that the various parameters in the ionization chamber are set so that pre-selected transit time conditions are established for the various ions formed. As described above, the transit time conditions are varied by changing the duration of the electric field. The same results can be achieved by adjusting the strength of the electric field, or the distance between the plates, by sliding the collector plate up or down. In this latter way, even though the time interval $t_1$ is held constant, the collector plate can be moved close enough to the region of ionization so that the fast ions are collected, and slow ions are not. The slow ions are collected by moving the collector plate even closer to the region of ionization.

Figure 5:
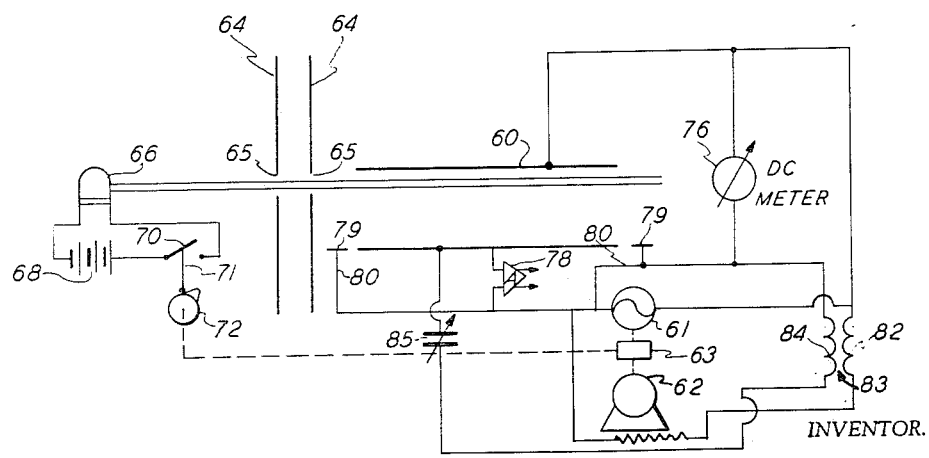
Fig. 5 is a schematic diagram of apparatus for analyzing gas by varying the phase angle between the ionizing radiation and an alternating electric field applied across a pair of collector plates.

Referring to Fig. 5, which shows schematically apparatus for varying the transit time conditions for ions by changing the phase angle between ionizing radiation and an alternating electric field, the gas sample to be analyzed is disposed between a pair of vertically spaced horizontal electrode plates 60 which are supplied a sinusoidal voltage from an A.C. source 61 driven by a variable speed motor 62 through an adjustable differential transmission 63. A pair of spaced collimating plates 64 are disposed at one end of the electrode plates 60 and have collimating slits 65 of a shape identical to that of the collimating plates shown in Fig. 2. An ultraviolet lamp 66 supplies U.V. radiation through the collimating slits so that a relatively thin plane of U.V. radiation passes between the electrode plates in a direction parallel to them and nearer to the top plate. The U.V. lamp is supplied power from a source 68 through a switch 70 which is periodically opened and closed by a push rod that slides on a cam 72 driven by the differential transmission. The ion current flowing to the collector electrodes is measured either by a D.C. ammeter 76 or an A.C. amplifier 78 as explained below.

The D.C. ammeter is connected in series with the plates and the A.C. source. One side of the A.C. amplifier is connected to the lower or collector electrode plate, and separate guard plates 79 spaced from each end of the collector plate are connected by a lead 80 to the other side of the A.C. amplifier, which is connected to one side of the A.C. source. A primary winding 82 of a compensating transformer 83 is connected across the A.C. source, and a secondary winding 84 of the transformer is connected through a variable neutralizing capacitor 85 across the A.C. amplifier to prevent the voltage from the A.C. source due to interelectrode capacitance from being applied to the A.C. amplifier. Preferably the voltage supplied by the secondary winding is at least twice that supplied by the A.C. source, and the neutralizing capacitor is correspondingly small to prevent the desired signal from being shorted by the capacitor.

For the purpose of explaining the operation of the apparatus of Fig. 5, it is assumed that the gas sample being analyzed consists essentially of equal parts of two gaseous components, A and B, component A having a higher ion mobility than component B.

Fig. 6 shows how the voltage "V" between the electrode plates varies cyclically with time "$t$". By suitable setting of the adjustable differential transmission, the U.V. lamp is synchronized to furnish a pulse of U.V. radiation at any desired ionization time of the voltage cycle to ionize the gas mixture and form electrons and positive ions. The phase angle "P" between the plate voltage and the pulse of U.V. radiation is varied from any value between zero and $\pi$ by suitable adjustment of the differential transmission. For example, when the phase angle is zero, the U.V. lamp is flashed just as the upper plate is starting to go positive with respect to the lower plate. The parameters of the apparatus are such that all of the electrons are attracted to the upper plate and all of the positive ions formed by the radiation are attracted to the collector plate. Thus, a combined ion current $I_{(A+B)}$ of ions of both components A and B is recorded by the D.C. meter. See Fig. 7.

As the phase angle is gradually increased, say to $P_B$, the U.V. lamp is flashed so late in the plate voltage cycle that only the relatively fast moving ions of component A are attracted to the collector plate, the ions of component B being so slow that the voltage between the two plates reverses before any substantial quantity of ions of component B reach the collector plate. The ions of component B are then subjected to a reversed electric field for a full half cycle of the plate voltage and are driven to the upper electrode where they are neutralized. Thus, at phase angle $P_B$, the ion current recorded by the D.C. meter drops from $I_{(A+B)}$ to $I_A$. As the phase angle is further increased to $P_A$, the flash of U.V. radiation occurs so late in the first half of the plate voltage cycle that the ions of component A also fail to reach the collector plate and therefore, the current drops to zero as indicated in Fig. 7, because all ions are collected at the upper plate during the second half of the plate voltage cycle. The proportion of current due to ions from each of the components is a measure of the relative concentrations of the two components.

It is sometimes helpful in making gas analysis to have signals which occur as characteristic peaks. When this is desired, the apparatus of Fig. 5 is operated in the manner shown by the graph of Fig. 8, the A.C. amplifier being used to get the desired results shown in Fig. 9. As shown in Fig. 8, the phase angle "P" is cycled through a relatively small increment at one frequency, and at the same time is gradually cycled through a larger increment at a lower frequency. Thus, as shown in Fig. 8, the phase angle follows an approximate "saw-tooth" curve at a relatively low frequency, while at the same time fluctuating about the average saw-tooth curve value at a higher frequency. As overall time "$t$" increases, the average value of the phase angle "P" increases along dotted line $P_{avg}$, and changes gradually from P=0 to P=$\pi$, when the average phase angle drops again to zero, and the cycle is repeated to produce the saw-tooth curve. Simultaneously, as the average phase angle gradually increases, the adjustment of the differential transmission is varied either manually or automatically, so the U.V. lamp is cycled to cause a small instantaneous variation in the phase angle as shown by the solid line curve $P_{inst}$ of Fig. 8.

The A.C. amplifier is tuned to the frequency of curve $P_{inst}$, and its output is essentially the derivative of the curve of Fig. 7. Thus, the amplifier output is in the form of peaks similar to those of conventional instruments, as shown in Fig. 9, and the area under each peak is proportional to the component producing it.

I claim:

1. The method for analyzing a gas sample having two constituents which have different ionic mobilities, the method comprising the steps of causing the constituents to become ionized, subjecting the ions to an electric field of one polarity between two electrodes to drive ions toward one of the electrodes, maintaining said field of said one polarity until a substantial number of ions of higher mobility are collected at said one electrode, and thereafter reversing the polarity of the electric field before any significant number of ions of lower mobility are collected at the said one electrode, whereby more ions of high mobility are collected at the said one of the electrodes than ions of lower mobility.

2. The method for analyzing a gas sample having two constituents which have different ionic mobilities, the method comprising the steps of causing the constituents to become ionized, subjecting the ions to an electric field of one polarity between two electrodes to drive ions toward one of the electrodes, maintaining said field of said one polarity until substantially all of the ions of higher mobility are collected at said one electrode, and thereafter reversing the polarity of the electric field before any significant number of ions of lower mobility are collected at the said one electrode, whereby more ions of higher mobility are collected at the said one of the electrodes than ions of lower mobility.

3. The method for analyzing a gas sample having two constituents which have different ionic mobilities, the method comprising the steps of causing the constituents to become ionized, subjecting the ions to a pulsating electric field of one polarity between two electrodes to drive ions toward one of the electrodes, maintaining said field of said one polarity until a substantial number of ions of higher mobility are collected at said one electrode, and thereafter reversing the polarity of the electric field before any significant number of ions of lower mobility are collected at the said one electrode, whereby more ions of higher mobility are collected at the said one of the electrodes than ions of lower mobility.

4. The method for analyzing a gas sample having two constituents which have different ionic mobilities, the method comprising the steps of irradiating the sample with a pulse of electromagnetic radiation to ionize the two constituents in the sample, subjecting the ions to an electric field of one polarity between two electrodes to drive ions toward one of the electrodes, maintaining said field of said one polarity until a substantial number of ions of higher mobility are collected at said one electrode, and thereafter reversing the polarity of the electric field before any significant number of ions of lower mobility are collected at the said one electrode, whereby more ions of higher mobility are collected at the said one of the electrodes than ions of lower mobility.

5. The method according to claim 4 in which the sample is simultaneously subjected to the electromagnetic radiation and the electric field.

References Cited in the file of this patent

UNITED STATES PATENTS

| | | |
|---|---|---|
| 2,387,550 | Winkler | Oct. 23, 1945 |
| 2,691,108 | Berry | Oct. 5, 1954 |
| 2,764,691 | Hipple | Sept. 25, 1956 |